Patented Mar. 12, 1929.

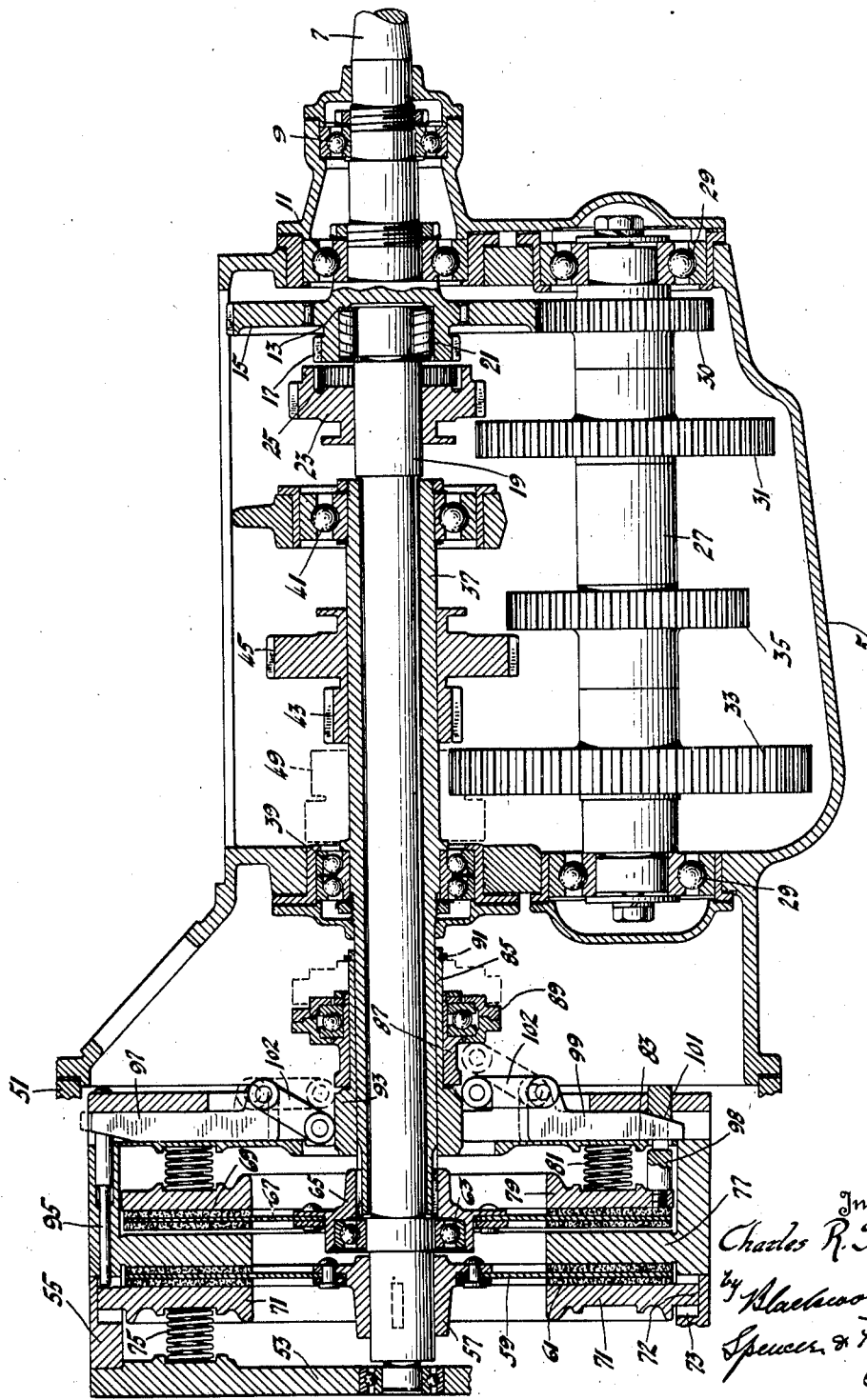

1,705,032

UNITED STATES PATENT OFFICE.

CHARLES R. SHORT, OF DETROIT, MICHIGAN, ASSIGNOR TO GENERAL MOTORS CORPORATION, OF DETROIT, MICHIGAN, A CORPORATION OF DELAWARE.

CHANGE-SPEED GEARING.

Application filed January 3, 1927. Serial No. 158,628.

This invention relates to clutches and transmission intended for use on motor vehicles, although its field of usefulness is not thus restricted.

The object of the invention is to provide for a continuous transmission of power during the period of gear changing.

Other objects and advantages will be understood upon the reading of the following specification and an examination of the accompanying drawing.

In the drawing the single figure is a longitudinal vertical section through a combined clutch and transmission assembly embodying my invention.

Referring by reference characters to the drawing, numeral 5 represents a transmission housing. Projecting from the rear wall of this housing is a shaft 7 which shaft may be equipped if desired with one member of a universal joint for connection with the propeller shaft, not shown. Shaft 7 extends forwardly through bearings 9 and 11 at the rear end of the housing. Just within the bearing 11 the shaft is enlarged and provided with an open end 13. The shaft at its enlarged end is provided with an external gear 15 and at its extreme forward end with external radial clutch teeth 17.

Shaft 19 is piloted within the open end of shaft 7 where there are provided bearings 21. Slidable but not rotatable on shaft 19 is a clutch gear member 23. Gear 23 has internal clutch teeth 25 for engagement with external clutch teeth 17.

At 27 is shown a countershaft suitably journalled for rotation in the housing walls at 29. This shaft has a gear 30 which is always in mesh with gear 15. It also has a gear 31 with which gear 23 may be engaged when moved to the left from its neutral position shown in Figure 1. Countershaft 27 is also provided with gears 33 and 35 for a purpose to be explained.

Surrounding shaft 19 and co-axial therewith is an elongated sleeve 37. This sleeve is supported in the front transmission housing wall by a bearing 39. A second bearing for the shaft is shown within the transmission housing at 41. By this method of mounting shaft 37 it is concentric with shaft 39 and is rotatable independently of said shaft and out of contact therewith. Said sleeve 37 has a slidable and non-rotatable double gear member comprising gears 43 and 45. Gear 43 is to mesh with gear 33 and gear 45 is to mesh with gear 35, these gear engagements being effected by a sliding movement of the combined gear from its neutral position as shown in the drawing.

Upon a shaft, parallel with the aligned shafts and with the countershaft, not illustrated, is a reverse idler double gear shown by dotted lines at 49. Suitable shifting means, not shown is provided for shifting this reverse idler to the right whereupon one of its gear elements is brought into engagement with gear 33 and the other with gear 43. It will be understood that the rotation of gear 43 then rotates the countershaft through the idler gear 49.

Forwardly of the transmission housing is a clutch housing, a fragment only of which is shown and represented by numeral 51. Within the clutch housing is a fly wheel member which fly wheel member is to be given a movement of rotation by connection with the motor of the vehicle. The fly wheel member comprises a forward wall 53 and a peripheral ring 55. Into the clutch housing and also into the enclosure formed by the fly wheel member as described there extends both the shaft 19 and co-axial sleeve 37. Secured to the extreme front end of shaft 19 is a hub 57 from which extends a plate 59 faced on its opposite sides by annular friction rings 61. A bearing 63 to the rear of hub 57 rotatably supports a hub portion 65 keyed to the extreme forward end of sleeve 37. To this hub 65 is secured a plate 67 and friction discs 69 as in the case of plate 59. Within the fly wheel member is a pressure plate 71 slidably but non-rotatably mounted by means of lugs 72 and slots 73. Springs 75 have an abutment at one end upon the wall 53 and at their other end engage pressure plate 71 and urge it yieldingly against the friction rings 61 carried by plate 59. The plate 59 is thus frictionally held between the pressure plate and an integral intermediate part 77 of the fly wheel member.

A second pressure plate is shown at 79. It is normally urged forward by springs 81 having a rear abutment at 83 upon a part rigid with the fly wheel. As in the usual form of clutch there is an annular series of springs for each pressure plate. The two clutches are thus seen to be capable of rotating, one of them the shaft 19 and the other the sleeve 37. It is intended that one clutch shall be disconnected when the elements of the other clutch are brought into frictional engagement. For the accomplishment of this end the following structure has been designed.

The abutment 83 is provided with an extended sleeve 85 which is concentric with the shaft 19 and sleeve 37. Slidably arranged on sleeve portion 85 is a collar 87 which may be moved by a shifting ring 89. Stops 91 and 93 limit the movement of the collar 87.

In an annular series adjacent the periphery of the fly wheel member there is a plurality of rods 95 positioned and arranged for axial movement. At one end these rods engage the pressure plate 71. At the other and rear end the rods are wedge shaped to engage the wedge shaped ends of a series of reciprocating bars 97. When outwardly reciprocated together, the several bars 97 push outwardly through the co-operating wedge faces upon rods 95, which in turn move the pressure plate 71 away from the clutch 59 and against the compression of springs 75. The clutch connection between the fly wheel and the shaft 19 is thus broken. Another series of rods 98 is associated with pressure plate 79. These rods have their ends reduced and threaded into the pressure plate 79. They have openings provided with wedge shaped faces 101 engaging corresponding faces on bars 99, which bars 99 are arranged to be reciprocably mounted. When these bars 99 reciprocate outwardly they engage the wedge faces of rods 98 and thereby withdraw the pressure plate 79 from the friction member 67 carried by the driving sleeve 37.

A series of links 102 are connected to the reciprocating bars 97 and 99 and to extended ends on collar 87. The links are so positioned that one movement of the collar moves one pressure plate against the pressure of these springs and simultaneously releases the other pressure plate so that it is subject to the action of its springs. The figure shows one of the bars for each of the clutches in full lines. It will be observed that the portions of the collar to which are connected the links for bars 97 are extended forwardly beyond portions of collar 87 to which are connected the links for bars 99. By this means when the collar is in the position shown by the figure, the links for bars 97 extend at an angle to the plane of the bars 97 while the links for rods 99 extend radially and in a plane parallel to the plane of the bars. In this position the radial links have moved bars 99 outwardly and have withdrawn pressure plate 79 from a clutch member 77 thereby releasing the drive between the engine fly wheel and driving sleeve 37. Simultaneously the links connected with bars 97 have moved angularly and springs 75 have pressed the pressure plate 71 against the friction member 59 thereby making frictional clutch connection between the fly wheel and shaft 19. If now collar 87 should be moved rearwardly it will be readily seen that links 102 controlling bars 97 will assume the vertical position as shown in Figure 1 whereby the clutch connection to the shaft 19 is broken, at the same time the links 102 which are in operated connection with bars 99 will assume the angular position shown in the lower half of the figure whereupon bars 99 are withdrawn to the dotted position and springs 81 bring about a clutch connection between the fly wheel and sleeve 37.

The transmission has been designed to give four forward speeds and one reverse. The fourth or highest speed is obtained by a direct clutch connection between shafts 19 and 7 through teeth 25 and 17. This direct connection is accomplished by a movement of the clutch gear element 23 towards the right in the figure. Shaft 19 is also capable of driving shaft 7 through gears 23 and 31 and through gears 30 and 15. This affords the second speed gear ratio. Third speed is secured from the sleeve 37. When the sleeve is driven and when gear 45 is moved to engage gear 35 the countershaft is driven from the sleeve and the driven shaft is driven from the countershaft through gears 30 and 15. First or low speed is had by the engagement of gear 43 with 33, the drive being completed through gears 30 and 15 as in the case of third speed. It is thus seen that the several shifts in going progressively from fourth to first speed or from first to fourth, bring into use alternately the shaft 19 and the sleeve 37. By this means it is possible to continue driving through any one of these gear trains even after the gears for the next higher or lower ratio are engaged, for example, if one is driving in fourth or high speed he may make the shift for third speed by sliding gear 45 into mesh with gear 35. This can be done while the clutch connection at 17 is still effective for the reason that sleeve 37 is free to rotate, its clutch being disconnected. When now the clutch is reversed the drive through fourth speed is released and the third speed becomes effective since the release of the clutch for shaft 19 is accompanied by the engagement of the clutch for sleeve 37. Similarly it will be seen that the successive shifts from the third to second and second to first may be made without first disturbing the clutch which operates the gearing then in use.

It is contemplated that shifting mechanism will be adopted to operate the clutches and gear trains in proper timed relation by a single movement. This will enable the operator to make the desired changes from one speed to the next with ease. It is also contemplated that these shifts shall be made automatically so as to establish the correct gear ratio for the vehicle at any time in accordance with the capacity of the power plant.

Various means may be adopted for the accomplishment of this result, no such means being shown or claimed in this application.

I claim:

1. In change speed transmission, a plurality of clutches, coaxial shafts one rotated by each clutch, a slidable member on each shaft, a driven shaft, selective gearing between the driven shaft and each of said slidable members.

2. In change speed transmission, a driving shaft, an encircling driving sleeve, a source of power, clutches, one for connecting said sleeve and another for connecting said shaft to said source of power, a driven shaft aligned with said first shaft, sliding members, one on said driving shaft and the other on said driving sleeve, a plurality of gear trains operatively connected to said driven shaft and selectively engageable by the movement of said movable members.

3. The invention defined by claim 2, there being two such gear trains for engagement with the slidable member on the sleeve.

4. The invention defined by claim 2, the slidable member of the driving shaft formed with clutch teeth, and clutch teeth on the driven shaft engageable therewith in one position of adjustment of the movable member of the driving shaft.

5. In a change speed transmission, a plurality of clutches, coaxial driving shafts, one driven by each clutch; an aligned driven shaft, a parallel countershaft, constantly meshed gears, one on the driven shaft and the other on the countershaft, other gears fixed to the countershaft, slidable gears, one on each of the coaxial driving shafts, and movable respectively into engagement with the countershaft gears.

6. The invention defined by claim 5, there being two fixed gears on the countershaft for engagement with one of said slidable members, the other slidable member and the driven shaft having co-operating clutch teeth for engagement in one position of adjustment of said slidable member.

In testimony whereof I affix my signature.

CHARLES R. SHORT.